US012745307B2

(12) United States Patent
Abraham

(10) Patent No.: US 12,745,307 B2
(45) Date of Patent: Sep. 22, 2026

(54) SESSION ESTABLISHMENT IN A WIRELESS NETWORK IN VIEW OF INTERFACE FAILURE

(71) Applicant: Cisco Technology, Inc., San Jose, CA (US)

(72) Inventor: Jis Abraham, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 308 days.

(21) Appl. No.: 18/523,327

(22) Filed: Nov. 29, 2023

(65) Prior Publication Data

US 2025/0176059 A1 May 29, 2025

(51) Int. Cl.
*H04W 76/25* (2018.01)
*H04W 60/04* (2009.01)
*H04W 76/10* (2018.01)
*H04W 76/27* (2018.01)

(52) U.S. Cl.
CPC ........... *H04W 76/25* (2018.02); *H04W 60/04* (2013.01); *H04W 76/10* (2018.02); *H04W 76/27* (2018.02)

(58) Field of Classification Search
CPC ..... H04W 76/25; H04W 60/04; H04W 76/10; H04W 76/27; H04W 76/12; H04W 76/18
See application file for complete search history.

(56) References Cited

U.S. PATENT DOCUMENTS

2019/0166647 A1* 5/2019 Velev .................... H04W 76/27
2021/0022197 A1 1/2021 Chiang
2021/0126828 A1* 4/2021 Vidyashankar ......... H04L 41/28
2021/0321325 A1* 10/2021 Srivastava .......... H04L 67/1034
2022/0014944 A1 1/2022 Liang et al.
2022/0053591 A1* 2/2022 Estevez ................. H04W 24/02
2022/0070757 A1* 3/2022 He .......................... H04L 45/28
2022/0124870 A1 4/2022 Bharatia et al.
2023/0036645 A1* 2/2023 Qiao ................... H04L 12/4633
2023/0292386 A1* 9/2023 Natarajan ............. H04W 60/00
2024/0129793 A1* 4/2024 Talebi Fard .......... H04W 48/06
2024/0129794 A1* 4/2024 Talebi Fard .......... H04W 48/18

FOREIGN PATENT DOCUMENTS

WO 2020063412 4/2020
WO 2022155169 A1 7/2022

OTHER PUBLICATIONS

"Restoration Procedures Related to the N4 Interface," 3GPP, Aug. 10, 2023, pp. 1-7.

(Continued)

*Primary Examiner* — Will W Lin

(74) *Attorney, Agent, or Firm* — Polsinelli P.C.

(57) ABSTRACT

A method includes detecting, using a session management function (SMF) at a core network component, an N4 session failure between the SMF and a User Plane Function (UPF) at the core network component, initiating, using the SMF, a timer for establishing an N4 session between the SMF and the UPF, maintaining, using the SMF, a user equipment connected to a network in an idle state while the timer is active, attempting, using the SMF, to establish the N4 session while the timer is active, and bringing, using the SMF, the user equipment back to an active state after the N4 session is established.

20 Claims, 11 Drawing Sheets

500

DETECT, USING A SESSION MANAGEMENT FUNCTION (SMF) AT A CORE NETWORK COMPONENT, AN N4 SESSION FAILURE BETWEEN THE SMF AND A USER PLANE FUNCTION (UPF) AT THE CORE NETWORK COMPONENT 502

INITIATE, USING THE SMF, A TIMER FOR ESTABLISHING AN N4 SESSION BETWEEN THE SMF AND THE UPF 504

MAINTAIN, USING THE SMF, A USER EQUIPMENT CONNECTED TO THE NETWORK IN AN IDLE STATE WHILE THE TIMER IS ACTIVE 506

ATTEMPT, USING THE SMF, TO ESTABLISH THE N4 SESSION WHILE THE TIMER IS ACTIVE 508

BRING, USING THE SMF, THE USER EQUIPMENT BACK TO AN ACTIVE STATE AFTER THE N4 SESSION IS ESTABLISHED 510

(56) References Cited

OTHER PUBLICATIONS

International Search Report and Written Opinion for International Application No. PCT/US2024/057262, mailed Feb. 18, 2025, 11 Pages.

Nokia, et al., "Correcting AMF Behaviour for Service Request That Is Not Integrity Protected", SA WG2 Meeting #132, S2-1903668, 3rd Generation Partnership Project, Mobile Competence Centre, 650, Route Des Lucioles, F-06921 Sophia-Antipolis Cedex, France, vol. SA WG2, No. Xi'an, PRC, Apr 8, 2019-Apr. 12, 2019, May 29, 2019, XP051748760, pp. 1-373, Retrieved from https://www.3gpp.org/ftp/tsg_sa/WG2_Arch/TSGS2_132_XiAn/Docs/S2-1903668.zip on May 29, 2019, p. 86, Paragraph 4.4—p. 142, Paragraph 4.11.1.4.2.

* cited by examiner

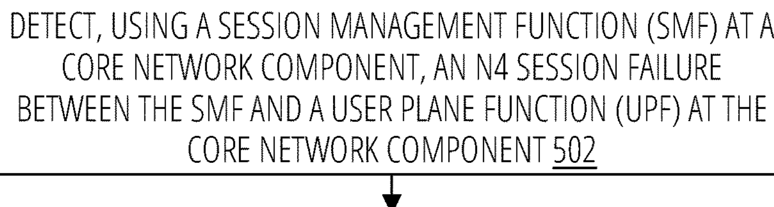

INITIATE, USING THE SMF, A TIMER FOR ESTABLISHING AN N4 SESSION BETWEEN THE SMF AND THE UPF 504

MAINTAIN, USING THE SMF, A USER EQUIPMENT CONNECTED TO THE NETWORK IN AN IDLE STATE WHILE THE TIMER IS ACTIVE 506

ATTEMPT, USING THE SMF, TO ESTABLISH THE N4 SESSION WHILE THE TIMER IS ACTIVE 508

BRING, USING THE SMF, THE USER EQUIPMENT BACK TO AN ACTIVE STATE AFTER THE N4 SESSION IS ESTABLISHED 510

FIG. 5

SESSION ESTABLISHMENT IN A WIRELESS NETWORK IN VIEW OF INTERFACE FAILURE

TECHNICAL FIELD

The subject matter of this disclosure relates in general to the field of computer networking, and more particularly, to addressing data and call session establishments in cellular networks due to interface failures.

BACKGROUND

Fifth generation (5G) mobile and wireless networks provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

In the 5G Core (5GC) network, an N4 interface connects between session management function (SMF) and User Plane Function (UPF) and is the bridge between a control plane and a user plane. A Policy and Control Function (PCF) uses different interfaces to communicate with the other network functions (NFs) or nodes. For example, the PCF uses an N7 interface to communicate with the SMF.

Network glitches are common in 5G network. The network glitches are temporary interruptions of a network connection between a client and a server during an open session or a transaction. Operators are looking for ways to minimize the impact to network glitches and end users.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 5 is a flow chart illustrating the steps of establishing a PDU session when N4 fails in accordance with some aspects of the disclosed technology;

DESCRIPTION OF EXAMPLE EMBODIMENTS

Figure 1A:
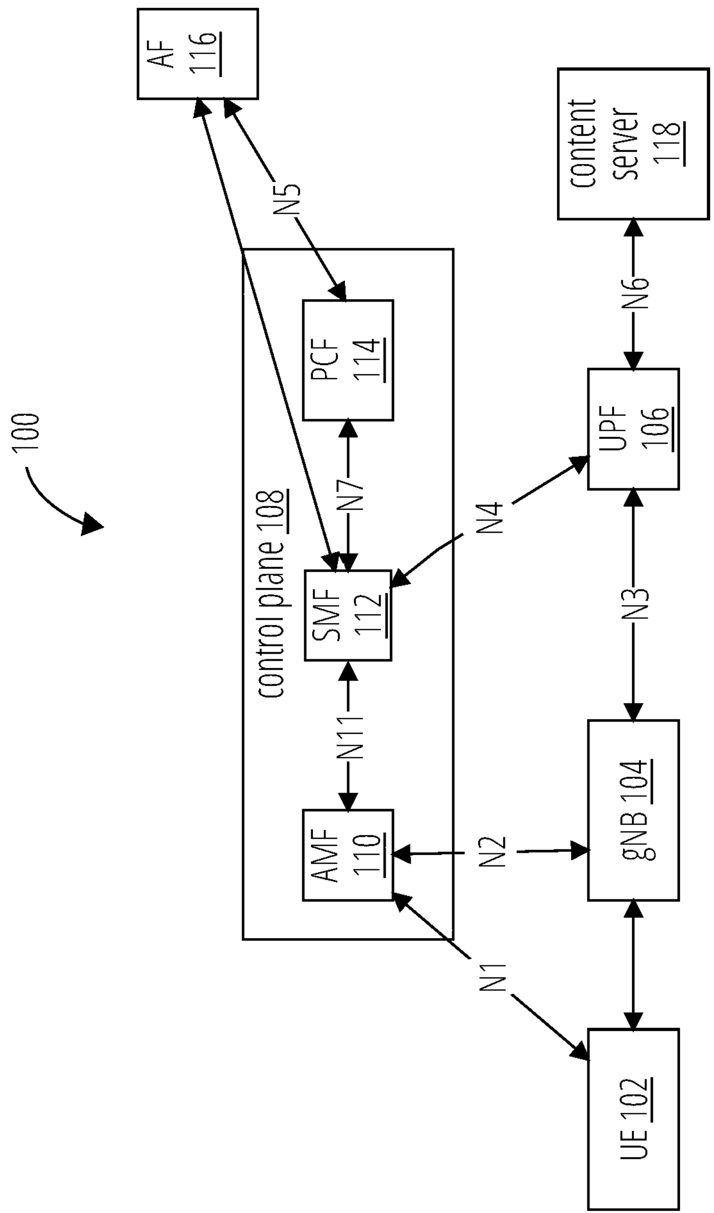
FIG. 1A illustrates an example of a data network, in accordance with some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Network glitches lead to call failures and retries. The retries result in increasing network load. The present technology provides a mechanism to reduce the network load by keeping user equipment (UE) in an idle state in case of N4 failures. The present technology also attempts to bring the UE back to an active state when the UE intends to send data. The present technology allows a session creation in case of the N4 interface failure. When the session creation is completed, an N2 session between the base station and SMF is not established such that an N3 data path between the base station and UPF is not established, which can reduce network load.

In one aspect, a method includes detecting, using a session management function (SMF) at a core network component, an N4 session failure between the SMF and a User Plane Function (UPF) at the core network component. The method also includes initiating, using the SMF, a timer for establishing an N4 session between the SMF and the UPF. The method also includes maintaining, using the SMF, a user equipment connected to a network in an idle state while the timer is active. The method also includes attempting, using the SMF, to establish the N4 session while the timer is active. The method also includes bringing, using the SMF, the user equipment back to an active state after the N4 session is established.

In some aspects, the method may also include detecting, using the SMF, a service request to establish an N3 path between a base station and the UPF in the network, where the base station is connected to the user equipment. The method may also include establishing an N3 session for the user equipment to send data over the N3 path while the timer is active.

In some aspects, the service request may be received from the user equipment, and N3 is an interface between the UPF and the base station.

In some aspects, the method may also include reattempting, using the SMF, to establish the N4 session after the timer is expired. The method may also include bringing the user equipment back to an active state when the N4 session is established after the reattempting.

In some aspects, the reattempting to establish the N4 session may include sending, using the SMF, an N4 session establishment request to the UPF. The reattempting to establish the N4 session may also include receiving, using the SMF, an N4 session establishment response from the UPF. The reattempting to establish the N4 session may also include sending, using the SMF, N1N2 transfer request to an Access and Mobility Management Function (AMF).

In some aspects, the attempting to establish the N4 session between the SMF and the UPF may further include sending, using the SMF, an N10 registration request to a Unified Data Management (UDM) at the core network component, where N10 is the interface between the SMF and the UDM. The attempting to establish the N4 session between the SMF and the UPF may further include receiving, using the SMF, a notification of N10 registration success from UDM. The attempting to establish the N4 session between the SMF and the UPF may further include sending, using the SMF, a N1N2 transfer request to the AMF.

In some aspects, an N3 data path between the UPF and the base station is not established during attempting to establish the N4 session.

In another aspect, a device includes a processor and a memory configured to store instructions that, when executed by the processor, configure the device to detect, using a session management function (SMF), an N4 session failure between the SMF and a User Plane Function (UPF). The device also includes a processor and a memory configured to store instructions that, when executed by the processor, configure the device to initiate, using the SMF, a timer for establishing an N4 session between the SMF and the UPF. The device also includes a processor and a memory configured to store instructions that, when executed by the processor, configure the device to maintain, using the SMF, a user equipment connected to a network in an idle state while the timer is active. The device also includes a processor and a memory configured to store instructions that, when executed by the processor, configure the device to attempt, using the SMF, to establish the N4 session while the timer is active. The device also includes a processor and a memory configured to store instructions that, when executed by the processor, configure the device to bring, using the SMF, the user equipment back to an active state after the N4 session is established.

In another aspect, one or more non-transitory computer-readable storage media include computer-readable instructions, which when executed by one or more processors of a core network of a wireless communication system, cause the core network to detect, using a session management function (SMF), an N4 session failure between the SMF and a User Plane Function (UPF). The one or more non-transitory computer-readable storage media also include computer-readable instructions, which when executed by one or more processors of a core network of a wireless communication system, cause the core network to initiate, using the SMF, a timer for establishing an N4 session between the SMF and the UPF. The one or more non-transitory computer-readable storage media also include computer-readable instructions, which when executed by one or more processors of a core network of a wireless communication system, cause the core network to maintain, using the SMF, a user equipment connected to a network in an idle state while the timer is active. The one or more non-transitory computer-readable storage media also include computer-readable instructions, which when executed by one or more processors of a core network of a wireless communication system, cause the core network to attempt, using the SMF, to establish the N4 session while the timer is active. The one or more non-transitory computer-readable storage media also include computer-readable instructions, which when executed by one or more processors of a core network of a wireless communication system, cause the core network to bring, using the SMF, the user equipment back to an active state after the N4 session is established.

EXAMPLE EMBODIMENTS

There are proprietary mechanisms implemented to support N10, N7, and/or N4 interface failure(s), which may often be referred to as interface open or interface failures. For example, during a packet data unit (PDU) session establishment, if an N10 interface between UDM and SMF fails, the interaction of UDM with SMF fails for a subscription fetch. Currently, local policies are defined on the SMF and allow the PDU session establishment. Similarly, if UDM registration fails, the PDU session establishment can continue for data calls. For example, if an N7 interface between PCF and SMF fails, the PCF's interaction with the SMF fails during the PDU session establishment, a session creation can proceed with local policies that are defined on the SMF for data calls. If an N4 interface between CHF and SMF fails, the CHF's interaction with the SMF fails during the PDU session establishment, a session creation can proceed with charging disabled or with offline charging.

IP Multimedia Subsystem (IMS) is a network architecture used in modern wireless networks, including 5G, and the IMS enables communication services, such as IP (Internet Protocol)-based voice calls and Short Message Service (SMS) services. The IMS session creation can continue with a few limitations. For example, the limitations may be that subsequent WIFI handover (HO) may not work, among others.

However, no failure mechanism is available for the N4 interface. If the N4 interface between UPF and SMF fails, the N4 session establishment fails, thus an N4 session creation fails. For the duration of network glitch, all session creations fail when there are issues on the N4 interface, which results in UE retransmissions. The UE retransmissions can result in increased load on the network and also can cause Key Performance Indicator (KPI) degradation.

The present technology addresses the need of handling the network glitches and reducing the waste of resources. In particular, network glitches due N4 failures are addressed. The present solution is based on the fact that some UEs may establish a PDU session with a core network, but may not transfer any data after establishing the PDU session. One or more aspects of the present disclosure provide that, in case of N4 failure during pdu session establishment, no N3 data path may need to be established between UPF and a base station as part of the N4 session establishment or N4 session creation, when a UE does not have any data to transmit.

One or more aspects of the present disclosure provide a mechanism for addressing an N4 interface failure, which may also be referred to as an N4 fail open, or an N4 interface glitch. The disclosed mechanism can enable establishing a PDU session even when an N4 interface between SMF and UPF fails. As will be described, SMF may start a timer to retry an N4 session establishment. Therefore, when an N4 session establishment fails, the SMF can keep the UE in an idle state while the timer is active. In other words, the UE may be maintained in an idle state during the N4 interface glitch. This allows the UE to trigger a service request to establish the N3 data path when the UE intends to send data. The SMF can wait for a service request from the UE to establish an N3 data path. The service request from the UE can bring the UE back to an active state. Aspects of the present disclosure enable the network to trigger a service request to reattempt to establish an N4 session. The disclosed solutions can reduce network load during an N4 interface glitch.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

Referring now to the drawings, wherein like reference numerals designate identical or corresponding parts throughout the several views, FIG. 1A illustrates a network 100 that includes a user equipment (UE) 102, a next generation NodeB (gNB) 104, a user plane function (UPF) 106, a control plane 108 (which includes an access and mobility management function (AMF) 110, a session management function (SMF) 112, a policy control function (PCF) 114), an application function (AF) 116, and a content server 118.

According to certain non-limiting examples, the network 100 can be a 5G wireless network 100 in which embodiments presented herein may be implemented. The network 100 may include a number of network nodes and/or entities, such as a user equipment (UE) device 102 (referred to simply as "UE" or "the UE"), e.g., a mobile telephone. The network 100 may be, for example, an enterprise private Third Generation Partnership project (3GPP) based network, such as a private Fifth Generation (5G) network for "private 5G." Such enterprise deployments may have mission-critical devices, Internet of Things (IoT) devices, and/or robotics devices, where application-specific Quality of Service (QoS) treatment, low latency, and reliability are key considerations.

It will be appreciated that the network 100 typically includes multiple UE devices; however, one UE is depicted for simplicity. The UE 102 may be any suitable type of device, such as a cellular telephone, a smart phone, a tablet device, an IoT device, a Machine-to-Machine (M2M) device, a robotics device, and a sensor, etc. UE 102 may obtain access to the private 5G network via one or more base stations, such as a gNB 104.

In the non-limiting example in FIG. 1A, the network 100 is illustrated with the gNB 104 being a next generation NodeB (gNB), but it is understood that, instead of using a gNB as the radio access network (RAN), the network 100 may be implemented using, as an RAN, one or more of an evolved universal mobile telecommunications system (UMTS) terrestrial radio gNB (E-UTRAN), a radio area network, and/or a next generation radio area network (NG-RAN) (each more generally referred to as a "RAN"). The gNB 104 may include one or more eNodeB (eNB) entities and/or one or more next generation NodeB (gNB) devices. The eNB and gNB entities (more generally referred to as a "gNB") may communicate with one another via one or more X2 (referred to as "Xn" in 5G) interfaces.

In the data plane, the network 100 also includes a UPF 106 and a content server 118. As discussed in more detail below, the data plane supports various methods for sending packet data units (PDUs) from the content server 118 to the UE 102 to achieve ultra-reliability and low latency communication (URLLC). Some of these methods support redundant flows of traffic over portions of the transmission path from the content server 118 to the UE 102 (e.g., copies of the same PDUs are sent along various legs of the transmission path). Thus, the UE 102 or gNB 104 may receive duplicate flows of packets/PDUs, such that when packets are dropped along a given leg of the transmission path due, e.g., to network problems, the UE 102 continues to receive at least one copy of the dropped packets/PDUs, to achieve URLLC.

In addition to the data plane of the network 100 over which flows of traffic are conveyed between the UE 102 to the content server 118, the network 100 also includes a control plane 108 to manage/control the data plane. The network 100 may include one or more local area networks (LANs) and one or more wide area networks (WANs), such as the Internet.

Control planes of a control plane 108 may be utilized in the network 100 for access and mobility management, session management, and/or policy management and control for the UE 102. In particular, the control plane 108 may include an Access and Mobility Management Function (AMF) 110 and a Session Management Function (SMF) 112. The AMF 110 and SMF 112 may be implemented as separate functions or components, or alternatively provided together as an integrated functionality (in whole or in part) and/or co-located at the same node or component. A PDU session at UPF 106 may be managed by SMF 112 over an N4 interface using a Packet Forwarding Control Protocol (PFCP), for example. In some implementations, control plane 108 is provided locally in the network 100. In other implementations, control plane 108 is provided as part of a cloud infrastructure. In some implementations, the private 5G network may be configured without use of a Policy and Control Function (PCF) 114.

UE 102 may communicate with access and mobility management function (AMF) 110 via the gNB 104. The AMF 110 may communicate control signaling (e.g., non-access stratum (NAS) signaling) with UE 102 using an N1 interface. The AMF 110 may communicate control signaling with the gNB using an N2 interface. The AMF 110 may facilitate communication by other network functions with UE 102 and/or the gNB 104. For example, other network functions may subscribe to notifications regarding mobility events relating to UE 102. The AMF 110 may support termination of non-access stratum (NAS) signaling, NAS ciphering and integrity protection, registration management, connection management, and/or mobility management. The AMF 110 may support access, authentication, and authorization (AAA) and/or security context management.

The AMF 110 may communicate control signaling with a session management function (SMF) 112 using an N11 interface. The SMF 112 may support session establishment, modification, and/or release. The SMF 112 may allocate and manage the allocation of an internet protocol (IP) address to UE 102. The SMF 112 may support dynamic host configuration protocol (DHCP) functions. The SMF 112 may support termination of NAS signaling related to session management. The SMF 112 may support traffic steering configuration for one or more user plane functions (UPFs) 106. When multiple AMFs are present, they may communicate with each other over one or more N14 interfaces.

The UPF 106 may communicate control signaling with the SMF 112 using an N4 interface. If multiple UPF entities are present, they may communicate control signaling with each other using one or more N9 interfaces. The one or more UPF 106 may communicate data signaling with the gNB 104 using an N3 interface. The UPF 106 may support packet routing and forwarding, packet inspection, and handling of quality of service (QoS). The UPF 106 may act as an external protocol data unit (PDU) session point of interconnect to a content server 118, such as the Internet. The UPF 106 may communicate data signaling with the content server 118 using an N6 interface. The UPF 106 may serve as an anchor point for mobility within and between radio access technologies (RATs).

A policy control function (PCF) 114 may communicate control signaling with the SMF 112 using an N7 interface. The PCF 114 may communicate control signaling with the AMF 110 using an N15 interface. The PCF 114 may provide policy rules to other control plane entities. The PCF 114 may provide access subscription information for policy decisions in a unified data repository, for example.

An application function (AF) 116 may communicate control signaling with the PCF 114 using an N5 interface. The AF 116 may support application influence on traffic routing. The AF 116 may interact with the PCF 114 to provide policy control. In the ensuing description, control signaling, data signal, and NAS signaling may be referred to more generally as "signaling."

Figure 1B:
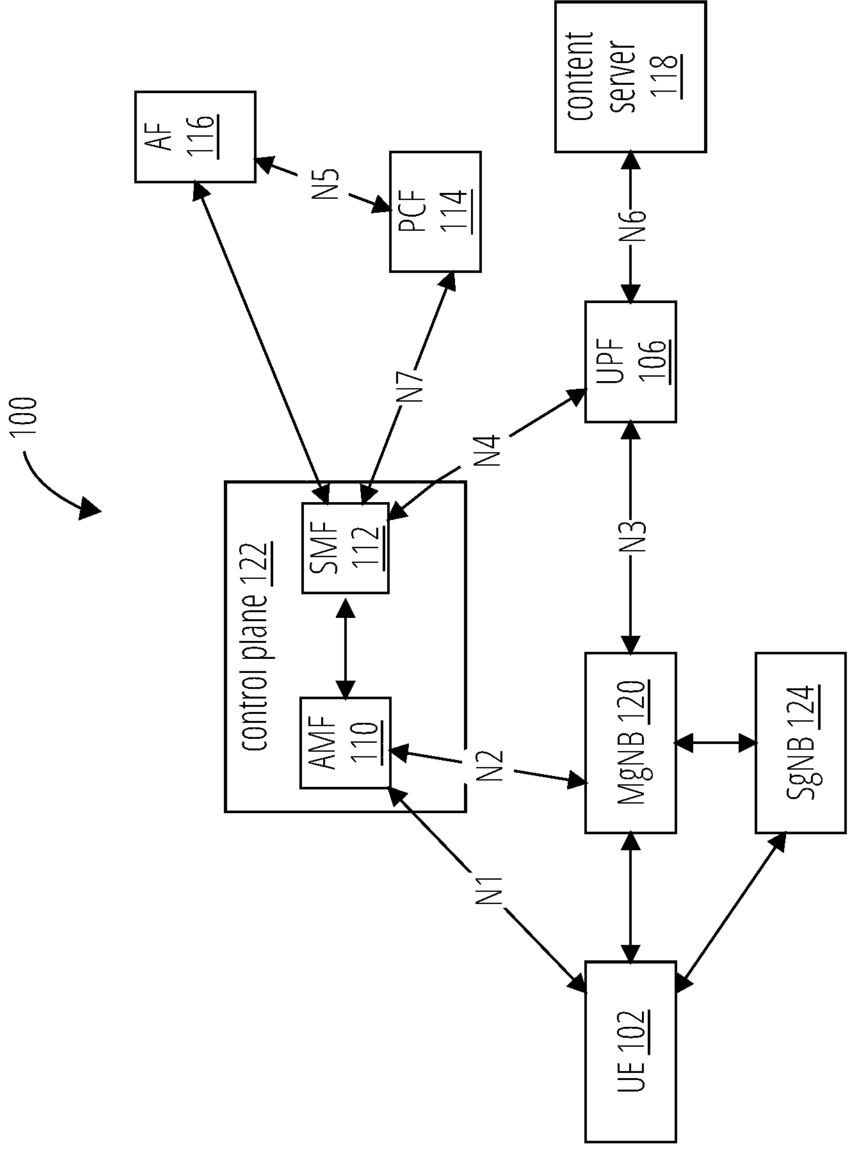
FIG. 1B illustrates an example of a data network with multiple radio access networks transmitting to a user equipment, in accordance with some aspects of the disclosed technology.

Like in FIG. 1A, FIG. 1B illustrates a non-limiting example of the network 100. In addition to the UE 102, the UPF 106, the control plane 122 that includes the AMF 110 and the SMF 112, a PCF 114, the AF 116, and the content server 118, the network 100 illustrated in FIG. 1B, includes two radio access networks (i.e., a first/master next generation nodeB (MgNB) 120 and a second/secondary generation nodeB (SgNB) 124). The MgNB 120 and the SgNB 124 have a same functionality as the gNB 104 in FIG. 1A, except there are two gNBs in FIG. 1B rather than one. This difference provides redundancy in case packets are dropped between one of the gNBs and the UE 102, to achieve URLLC.

Figure 2:
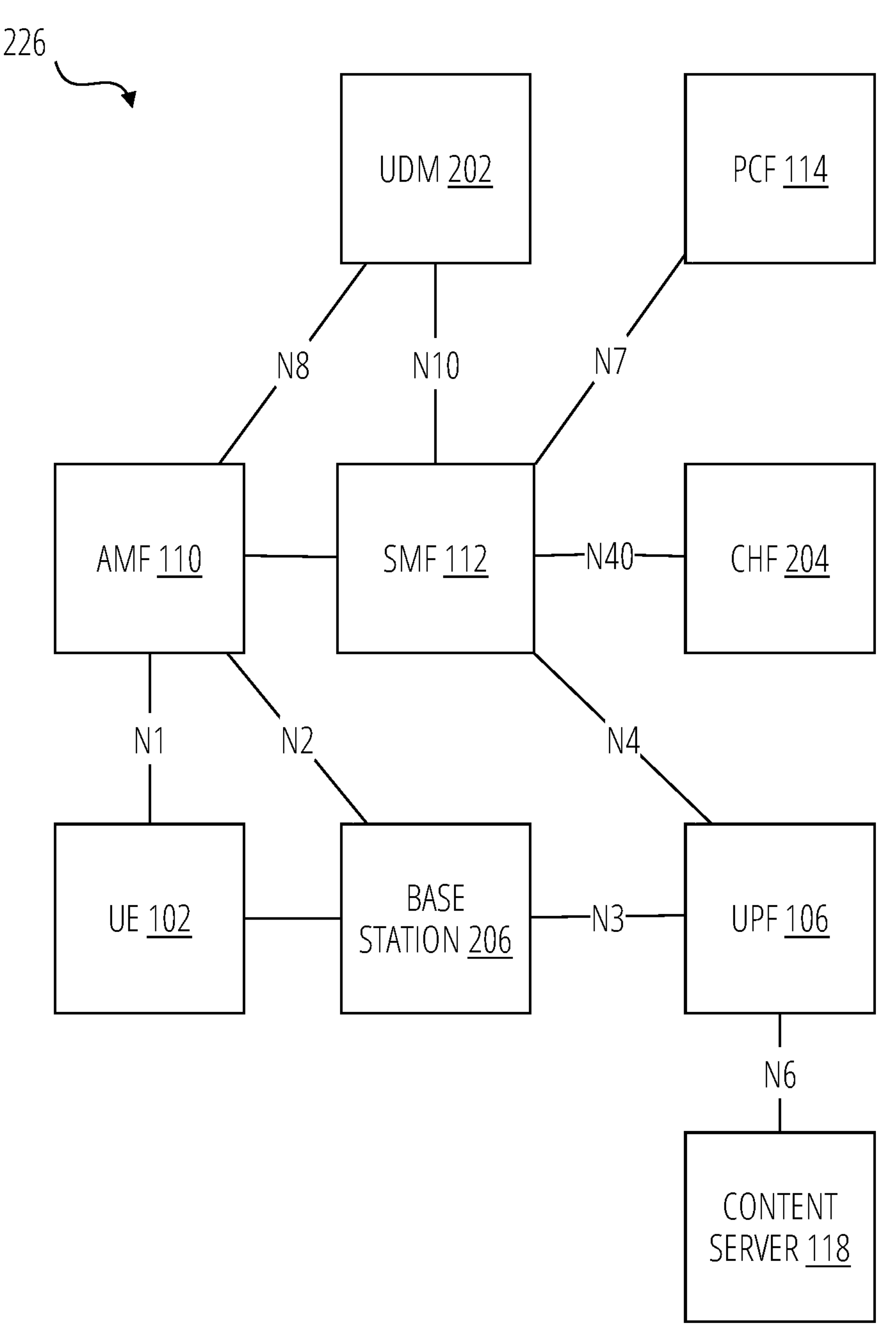
FIG. 2 illustrates a simplified network system diagram in accordance with some aspects of the disclosed technology.

FIG. 2 illustrates a simplified network system diagram in accordance with some aspects of the disclosed technology. As shown, a network system 226 includes Unified Data Management (UDM) 202 that communicates with SMF 112 via an N10 interface. UDM 202 communicates with AMF 110 via an N8 interface. The UDM 202 is a function or service that manages data. The data may be user data, e.g., data of subscribers. In 5G, UDM 202 is managing the user data for all other processes. UDM 202 is interfaced with many other services, including Authentication Server Function (AUSF), AMF, SMF, and Short Message Service Function (SMSF). AUSF is mainly for Authentication Process. AUSF receives authentication requests from the AMF 110 and interacts with UDM 202 to obtain authentication vectors for processing authentication, and validates network responses to determine whether or not the authentication was successful. The SMSF conducts subscription checking and performs a relay function between the device and the SMSC (Short Message Service Centre), through interaction with the AMF. When AUSF, AMF, SMF, and/or SMSF need subscriber data, they send request to UDM 202, which provides the data to respective services including AUSF, AMF, SMF, and/or SMSF.

The network system 226 also includes charging function (CHF) 204, which is deployed to complete the billing function. CHF 204 communicates with SMF 112 via an N40 interface.

The network system 226 also includes base station 206, e.g., gNB, which connects to UPF 106 via an N3 interface. The base station 206 also connects to AMF 110 via an N2 interface. The base station 206 is in communication with the UE 102 and can receive data from the UE 102 and can forward the data from the UE 102 to UPF 106 via an N3 data path.

The network system also includes N1, N3, N4, N7, and N6 interfaces, which are shown in FIGS. 1A and 1B and described related to FIGS. 1A and 1B.

The PCF 114 activates PCC rules for a PDU session in the SMF 112 for applications that require detection and reporting a start event or a stop event to the PCF 114. The SMF 112 then instructs the UPF 106 to detect the events. The PDU session is a connection between the UE 102 and a data network, e.g., internet or a private network. The PDU session is used to carry user data and to support different types of services, such as voice, video, and data.

The UE 102 initiates the PDU session establishment process by sending a request to the AMF 110 of the network system 226, which forwards the request to SMF 112, which are illustrated in FIGS. 3A-3B and FIGS. 4A-4C. The request includes information about the type of service that the UE 102 intends to use, and/or the type of traffic, among others. Once the PDU session is established, the UE can use the PDU session to send and/or receive data. The 5G core network manages the resources used by the PDU session to ensure that the 5G core network is used efficiently and the UE receives the appropriate quality of service (QoS). A PDU session establishment is the process of establishing a data path between the UE 102 and the 5G core network. The PDU session establishment enables the efficient and secure transport of data between the UE and the network.

Figure 3A:
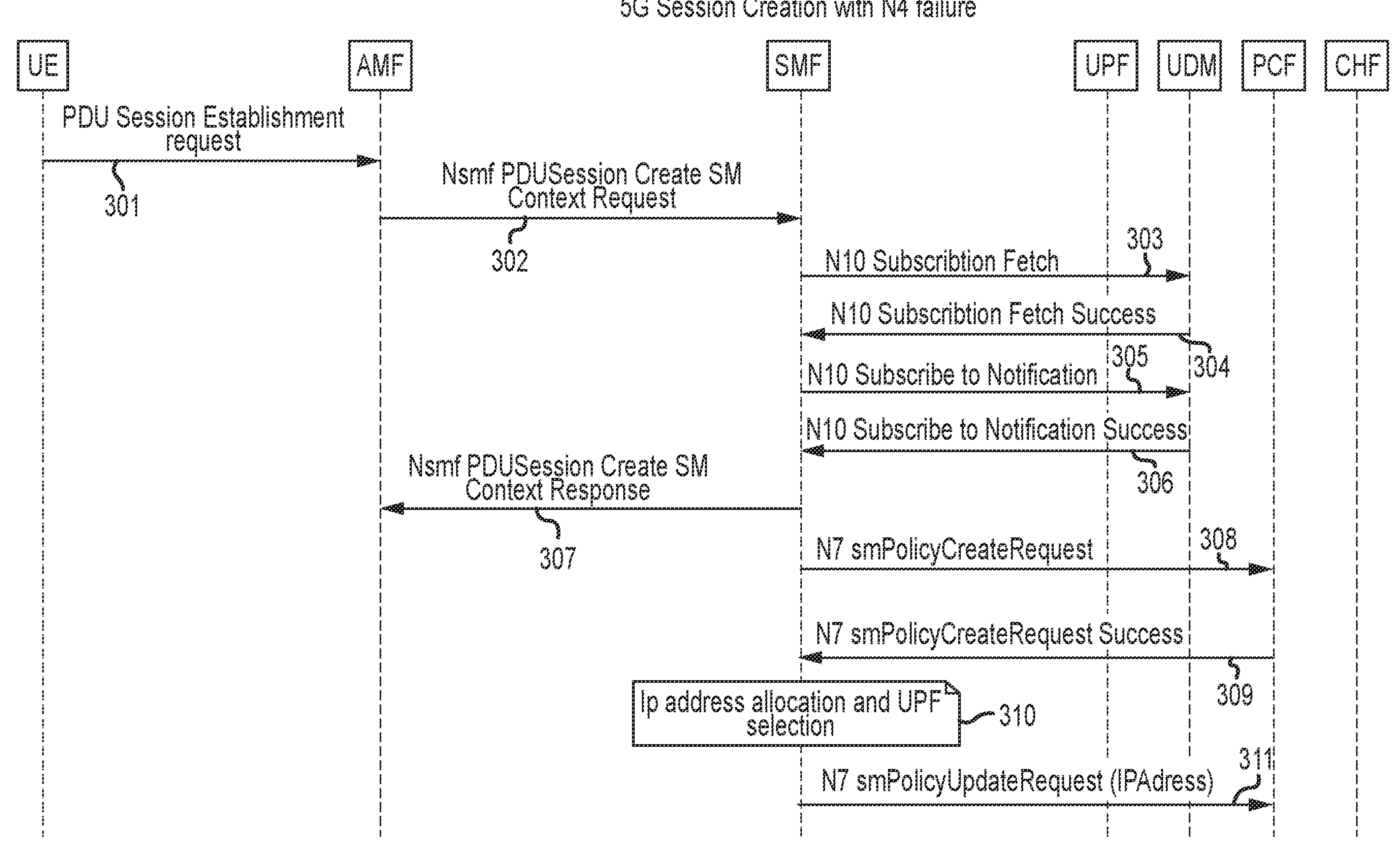
FIG. 3A illustrates a sequence diagram of a conventional N4 session establishment when N4 interface fails in accordance with some aspects of the disclosed technology.

FIG. 3A illustrates a sequence diagram of a conventional N4 session establishment when N4 interface fails in accordance with some aspects of the disclosed technology. Before an N4 session establishment, steps 301-315 are first completed. The N4 session establishment indicates that SMF 112 can communicate with UPF 106 via an N4 interface. A PDU session establishment may also be referred to as a 5G session establishment, or a 5G session creation. The PDU session establishment may be any one of an N4 session establishment or an N4 PDU session establishment, an N1 session establishment or an N1 PDU session establishment, an N2 session establishment or an N2 session establishment, an N3 session establishment or an N3 session establishment, an N7 session establishment or an N7 PDU session establishment, an N10 session establishment or an N10 PDU session establishment, etc., among others.

At step 301, UE 102 sends a PDU session establishment request to AMF 110.

At step 302, AMF 110 sends a NSMF_PDUSession_CreateSMContext Request to SMF 112.-Network Slice Management Function (NSMF) manages the life cycle of the end-to-end slice across the network domains, including Radio Access Network (RAN), 5G Core network, and the transport network. Network slicing enables operators to maximize the return on investment via efficient usage and management of the network resources.

Steps 303 to 306 relate to N10 session establishment or creation. At step 303, SMF 112 sends N10 subscription fetch to UDM 202. At step 304, SMF 112 receives N10 subscription fetch success notification from UDM 202. At step 305, SMF 112 sends N10 subscribe to notification to UDM 202. At step 306, SMF 112 receives N10 subscribe to notification success notification from UDM 202.

At step 307, SMF 112 sends NSMF PDU session creating SM context response to AMF 110.

Steps 308 to 312 relate to N10 session establishment or creation. At step 308, SMF 112 sends N7 SM policy creation request to PCF 114. At step 309, SMF 112 receives N7 SM Policy creation success notification from PCF 114.

Figure 3B:
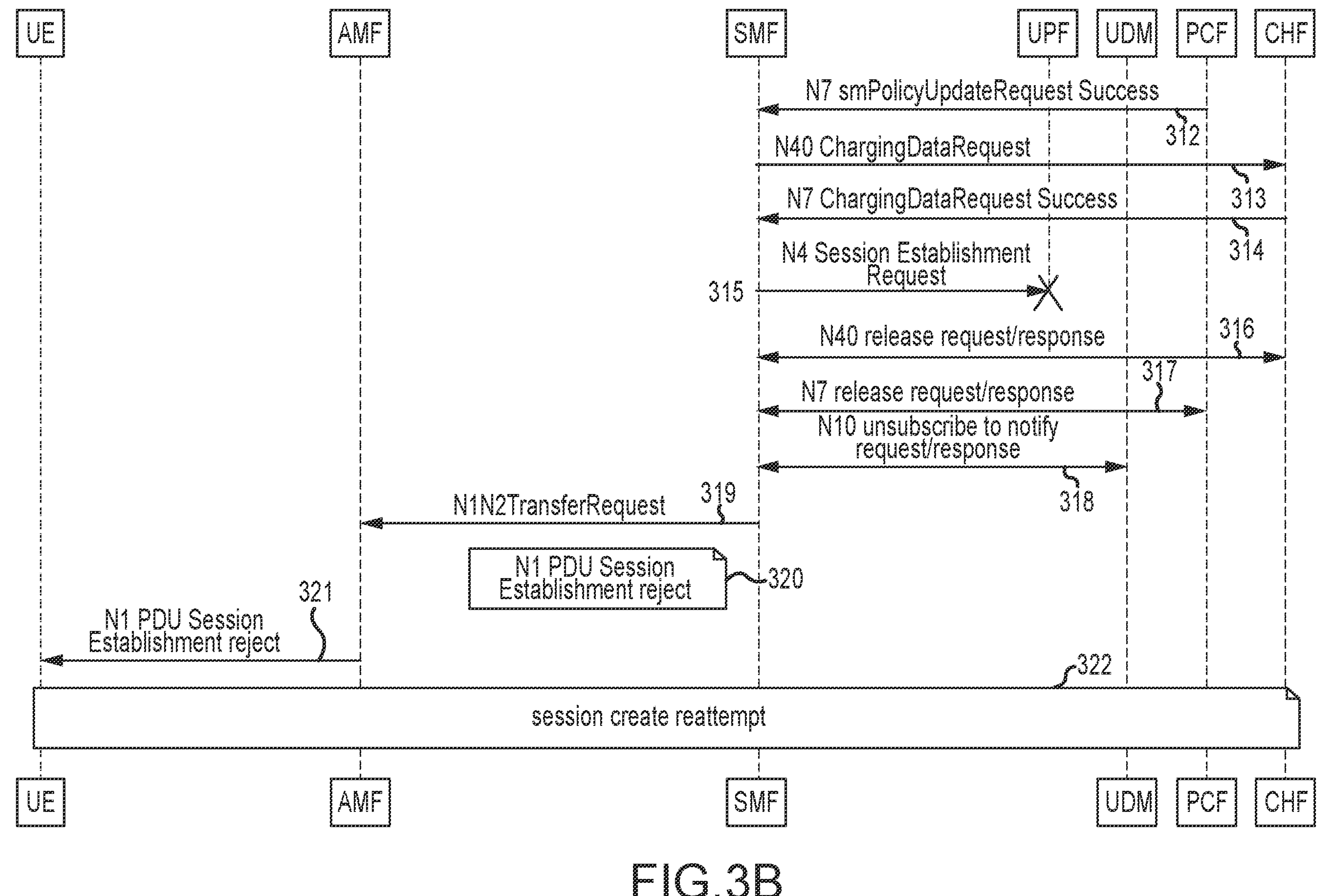
FIG. 3B illustrates a continuation of the sequence diagram of FIG. 3A in accordance with some aspects of the disclosed technology.

FIG. 3B illustrates a continuation of the sequence diagram of FIG. 3A in accordance with some aspects of the disclosed technology.

At step 310, SMF 112 performs the IP address allocation and also the UPF selection.

At step 311, SMF 112 sends an N7 session management policy update request to PCF 114. At step 312, SMF 112 receives an N7 session management policy update request success notice from PCFs 114.

Steps 313 to 314 relate to N40 session establishment or creation. At step 313, SMF 112 sends an N40 charging data request to CHF 204. At step 314, SMF 112 receives an N40 charging data request success notice from CHF 204.

When the N4 interface fails, SMF 112 communicates with UDM 202, PCF 114, and CHF 204 about the failure, including steps 315-321.

At step 315, SMF 112 sends N4 session establishment request to UPF 106.

At step 316, SMF 112 sends an N40 release request to CHF and receives an N40 release response from CHF.

At step 317, SMF 112 sends an N7 release request to PCF 114 and receives an N7 release response from PCF 114.

At step 318, SMF 112 sends an N10 unsubscribe to notify to UDM 202 and receives an N10 unsubscribe to notify from UDM 202.

At step 319, SMF 112 sends N1N2 transfer request to AMF 110 with N1 PDU session establishment rejected as indicated by block 320 in FIG. 3B.

At step 321, AMF 110 sends N1 PDU session establishment reject notice to UE 102.

At step 322, an N4 session creation is reattempted, including steps 301-321. The UE keeps trying to reestablish the session, which increases the network workload.

When N4 glitch occurs, SMF continues with the session establishment procedure with one exception. SMF does not trigger N2 setup. Thus, N3 is not established, and data radio bearers (DRB) are also not established. UE remains in an idle state.

Figure 4A:
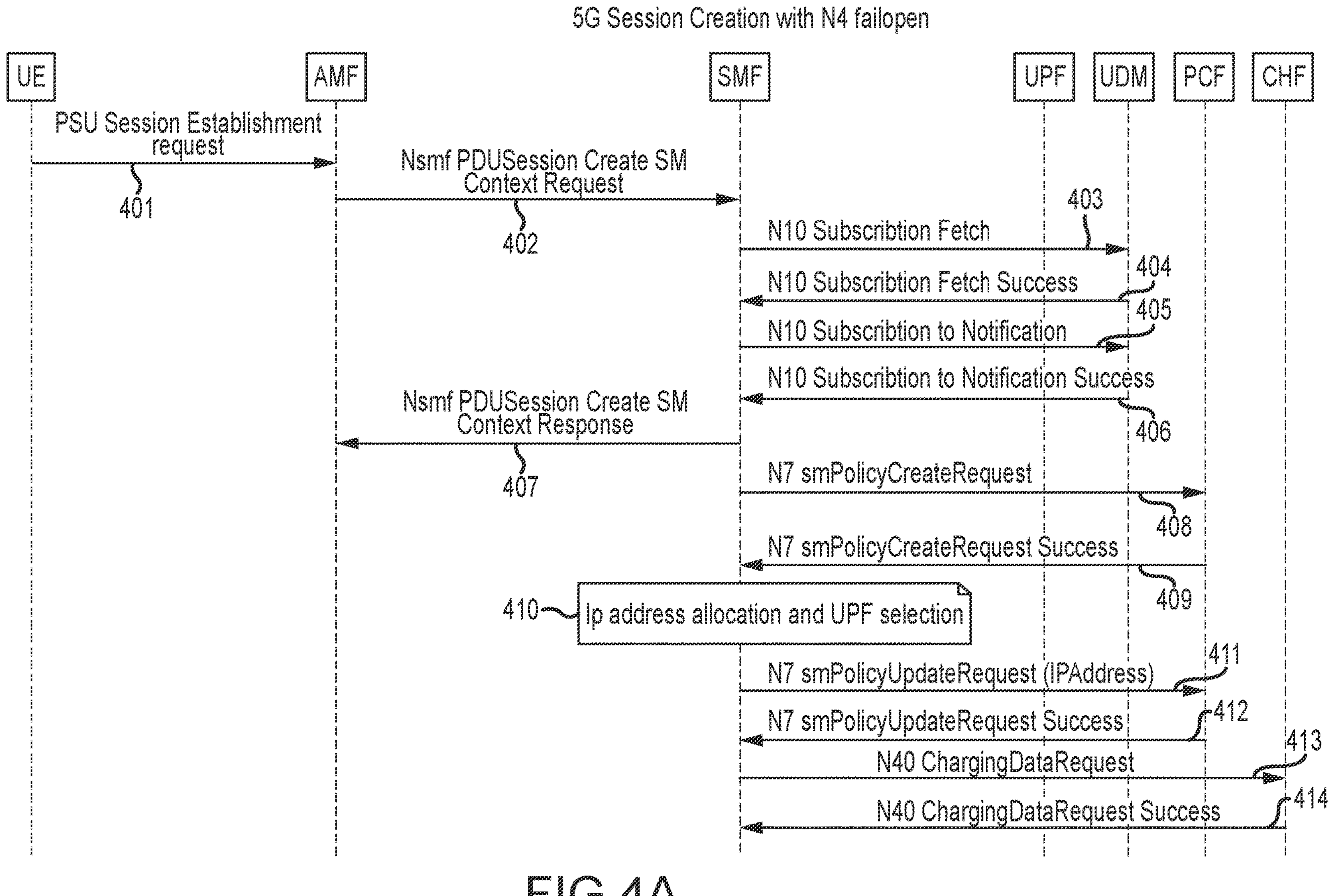
FIG. 4A illustrates a sequence diagram for establishing an N4 session when N4 interface fails and resulting reduced network load in accordance with some aspects of the disclosed technology.

FIG. 4A illustrates a sequence diagram for establishing a 5G session when N4 interface fails and resulting reduced network load in accordance with some aspects of the disclosed technology. Steps 401 to 414 in FIG. 4A are the same as steps 301-314 and hence will not be described again for sake of brevity.

Figure 4B:
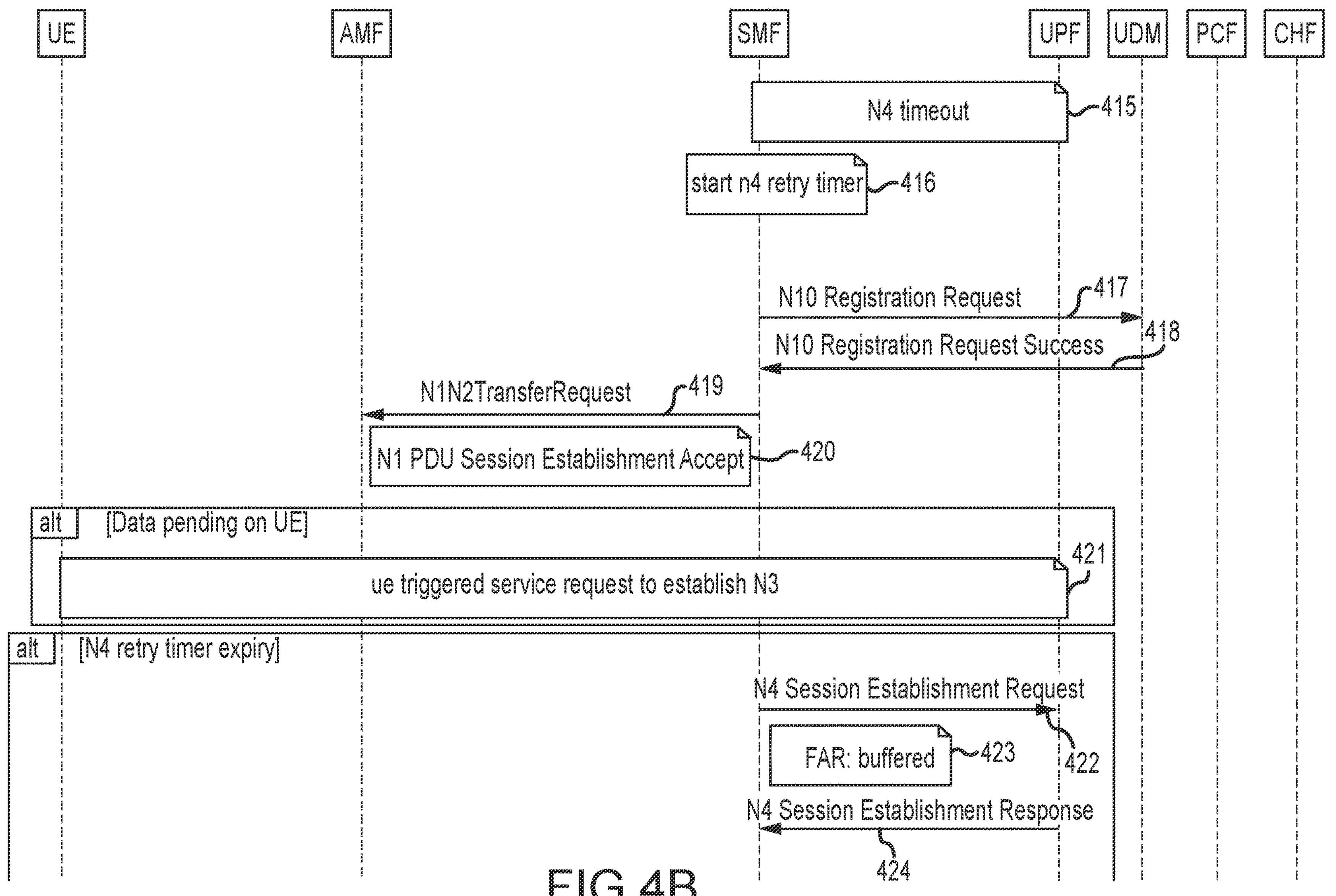
FIG. 4B illustrates a first continuation of the sequence diagram of FIG. 4A in accordance with some aspects of the disclosed technology.

FIG. 4B illustrates a first continuation of the sequence diagram of FIG. 4A in accordance with some aspects of the disclosed technology.

The present technology allows a session creation to complete even in case of the N4 interface failure during a PDU session establishment.

At step 415, the N4 glitch occurs or N4 interface is timeout.

At step 416, SMF 112 starts an N4 retry timer. SMF 112 start the timer to retry an N4 session establishment. When an N4 session establishment fails, the SMF can keep the UE in an idle state while the timer is active by not sending N2 setup request to GNB. Only N1 Pdu Establishment accept to UE is sent. In other words, the UE can be maintained in an idle state during the N4 interface glitch. The UE may also trigger a service request to establish the N3 data path when the UE intends to send data. The SMF waits for a service request from the UE or the timer expiry to re-establish an N3 data path. The service request from the UE can bring the UE back to an active state. This feature reduces network load during an N4 interface glitch.

The timer may start when the N4 glitch occurs or N4 interface fails or is open or timeout. While the timer is active, SMF 112 attempts to establish session, which is also referred to session creation with N4 fail open.

Figure 4C:
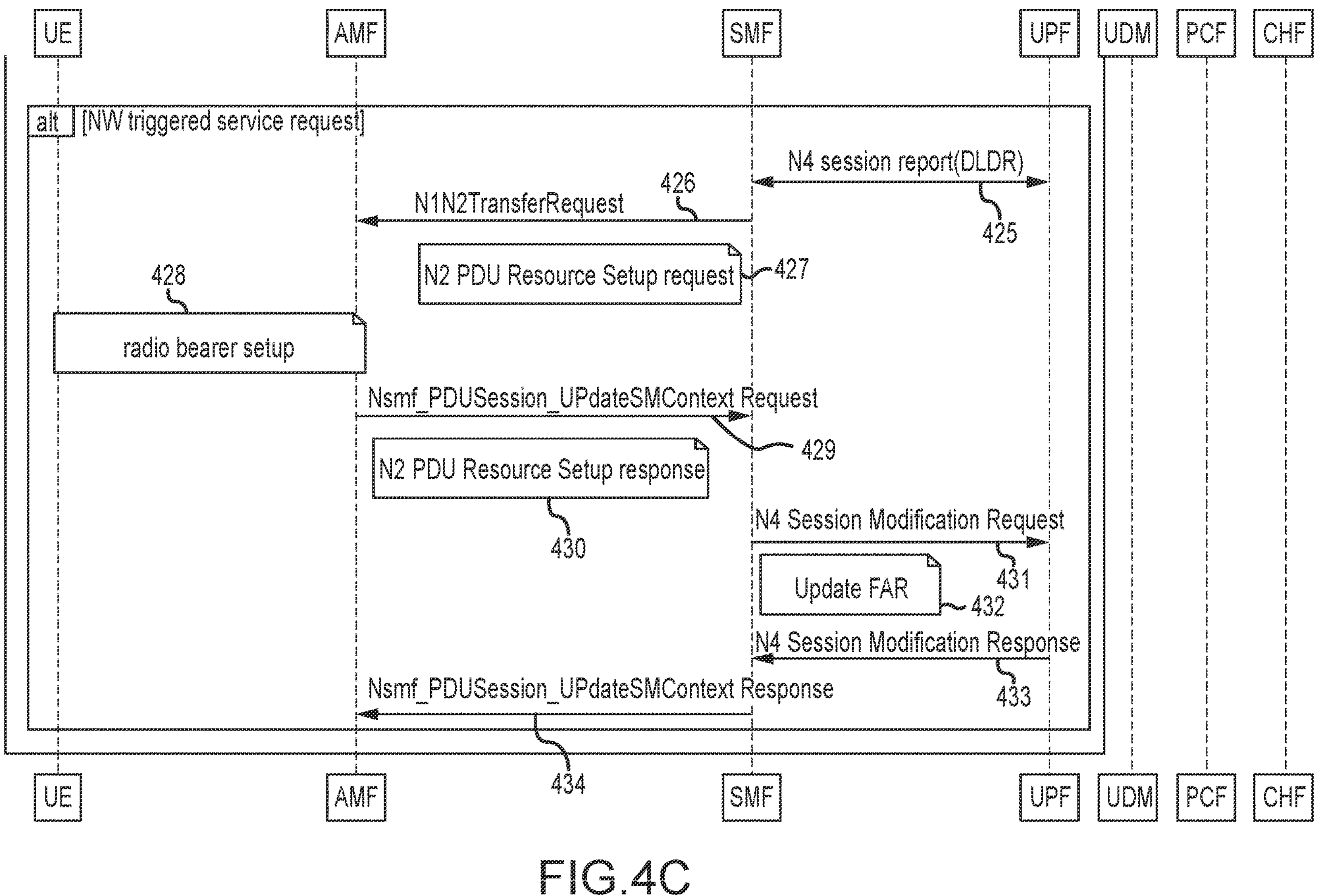
FIG. 4C illustrates a second continuation of the sequence diagram of FIG. 4A following the first continuation of FIG. 4B in accordance with some aspects of the disclosed technology.

The session creation with N4 fail open includes steps 417-419 in FIGS. 4B and 4C. The session creation with N4 fail open is also referred to as session establishment when N4 fails. During the session creation with N4 fail open, an N3 data path between AMF 110 and base station 206 is not established. In other words, an N2 session between SMF 112 and base station 206 is not established.

At step 417, SMF 112 sends an N10 registration request to UDM 202.

At step 418, SMF 112 receives an N10 registration success response from UDM 202. This response indicates that the UE 102 is maintained in an idle state while the timer is active or not expired.

At step 419, SMF 112 sends N1N2 transfer request to AMF 110, which forwards an N1 transfer request to UE 102. Note that SMF 112 does not send an N2 setup request to base station 206.

In one example, the N1N2 transfer request may include a message of N1 PDU session establishment accept, which indicates that an N1 PDU session between UE 102 and AMF 110 is established and thus indicates that the session creation is completed. This is shown as step 420 in FIG. 4B. The N1 PDU session establishment is also referred to as an N1 session establishment. When the session creation is completed, UE 102 would not receive any PDU establishment failure message and thus would not need to try to reconnect to establish the PDU session by performing steps 401-414, which adds a lot of loads to the network. Also, when the session creation is completed, an N2 session between the base station 206 and SMF 112 is not established.

The operations at steps 416 to 419 allow the UE 102 to be maintained in an idle state during the N4 interface glitch. By avoiding establishment of an N3 data path for many UEs, the network load can be significantly reduced.

The UE can be brought back to an active state by initiating a service request when the UE has data to be sent. SMF triggers N4 establishment on getting the service request from UE. After a successful N4 establishment, SMF sends N2 setup, which results in N3 establishment and DRB establishment. At step 421, when the UE 102 intends to send data when N4 fails, the UE 102 may trigger a service request to establish an N3 data path between base station 206 and UPF 106. The N3 data path allows the UE 102 to send data to base station 206, which forward the data from UE 102 to UPF 106. When UE is in an idle state, there is no data transfer. This feature can be useful for some UEs with the need for data transfer. For example, there may be about 5,000 UEs, but only some of the 5000 UEs may need to send data, for example, 40% of the UEs.

The network can also trigger a service request to reattempt to establish an N4 session after the time is expired. The present technology reattempts an N4 session establishment after the session creation and when the retry timer is expired. The reattempting of the N3 session establishment includes steps 422-424.

At step 422, SMF 112 sends an N4 session establishment request to UPF 106.

At step 423, SMF 112 sends N4 establishment request to UPF 106 with an indication to buffer any data from downlink as indicated by block 423 in FIG. 4B. In one example, UPF 106 can trigger paging request on getting downlink data and N3 data path can be established using network triggered service request procedure. Accordingly, UE 102 can be taken back to active state from idle state when there is pending data traffic.

At step 424, SMF 112 receives an N4 session establishment response from UPF 106.

The network may trigger a service request to bring the UE 102 back to active state, which include steps 422-434 in FIGS. 4B and 4C. Steps 422-434 relate to methods for network triggered service request to reattempt to establish a data path that includes N3 data path between UPF 106 and base station 206 and an N2 session between base station 206 and SMF 112.

FIG. 4C illustrates a second continuation of the sequence diagram of FIG. 4A following the first continuation of FIG. 4B in accordance with some aspects of the disclosed technology.

At step 425, SMF 112 and UPF 106 exchange a message that an N4 session report indicates that data are ready for transfer. This N1N2 transfer request is initiated by the SMF 112 of the network system, not initiated by the UE 102. Hence, the service request is triggered by the network, not by the UE 102.

At step 426, SMF 112 sends an N1N2 transfer request to AMF 110, which forwards an N2 transfer request to the base station 206, e.g., gNB.

In one example, the N1N2 transfer request at step 426 includes an N2 PDU resource setup request to base station 206 as indicated by block 427 in FIG. 4C. The N2 PDU resource setup is between AMF 110 and base station 206.

At step 428, radio bearer setup at the base station 206 (e.g., gNB) is completed. AMF 110 is notified about the radio bearer setup.

At step 429, SMF 112 receives a NSMF_PDUSession-_CreateSMContext Request containing N2 PDU resource setup response from AMF 110

In one example, the request at step 429 includes an N2 PDU resource setup response, which indicates that an N2 session is established between base station 206 and SMF 112, which is also referred to as an N2 session establishment. This is shown as block 430 in FIG. 4C. The N2 PDU resource setup response also indicates that an N3 data path is established between base station 206 and UPF 106, which is also referred to as an N3 session establishment.

At step 431, SMF 112 sends UPF 106 an N4 session modification request. For example, the N4 session establishment is modified to include the N2 PDU resource setup and the N3 data path establishment. SMF 112 includes FAR with GNB tunnel ID in N4 modification request as indicated in step 432 in FIG. 4C.

At step 433, SMF 112 receives an N4 session modification response from UPF 106. The N4 session is modified to include the N2 session establishment and N3 session establishment.

At step 434, SMF 112 sends an NSMF PDU session update SM context response to AMF 110. Now, the modified N4 session is established. The UE will be notified by AMF 110.

When the timer expires, SMF reattempts N4 establishment, but without GNB tunnel information. SMF does not trigger any N2 setup immediately after successful N4 establishment. If any downlink data comes from network after the successful N4 establishment, UPF triggers paging, which results in SMF sending N2 setup resulting N3 establishment and DRB establishment.

FIG. 5 is a flow chart illustrating the steps of establishing an N4 PDU session when N4 fails in accordance with some aspects of the disclosed technology. The N4 failure may occur due to the network glitch. The network may have a glitch of a short time, for example, about 5 seconds. FIG. 5 will be described from the perspective of a network component(s) configured to perform one or more network functions of a core network of a cellular network. It should be noted that such network component(s) may have one or more memories with computer-readable instructions stored therein and one or more processors configured to execute the computer-readable instructions to perform the operations described below with reference to FIG. 5.

At operation 502, method 500 includes detecting, using a session management function (SMF) at a core network component, an N4 session failure between the SMF and a User Plane Function (UPF) at the core network component. For example, the SMF 112 may detect an N4 session failure between the SMF 112 and the UPF 106 at the core network component. The core network component may be a computing device, a server or a controller. The operation 502 can be performs as described above with reference to step 415 in FIGS. 4A-4C.

At operation 504, method 500 includes initiating, using the SMF, a timer for establishing an N4 session between the SMF and the UPF. The operation 504 can be performs as described above with reference to step 416 in FIGS. 4A-4C. For example, the SMF 112 may initiate a timer for establishing an N4 session between the SMF 112 and the UPF 106. The duration of the timer may relatively short (e.g., may correspond to a typical glitch time, for example, ranging from 1 seconds to 60 seconds, among others). However, the duration of the timer may be a configurable parameter that can be set according to experiments and/or empirical studies.

In some aspects, method 500 may also include detecting, using the SMF, a service request to establish an N3 path between a base station and the UPF in the network, where the base station is connected to the user equipment. For example, the SMF 112 may detect a service request to establish an N3 path between the base station 206 and the UPF 106 in the network. Method 500 may also include establishing an N3 session for the UE 102 to send data over the N3 path while the timer is active. For example, the SMF 112 detects a service request to establish an N3 path between the base station 206 and the UPF 106 in the network, where the base station 206 is connected to the UE 102. The SMF 112 establishes an N3 session for the UE 102 to send data over the N3 path while the timer is active. The service request is initiated or triggered from the UE 102 when the UE 102 wants to send data.

At operation 506, method 500 includes maintaining, using the SMF, a user equipment connected to a network in an idle state while the timer is active. When UE is in an idle state, there is no data transfer. For example, the SMF 112 maintains a UE 102 connected to a network in an idle state while the timer is active. This feature can be useful for many UEs without any need for data transfer. For example, there may be about 5,000 UEs, but only some of the 5000 UEs may need to send data, for example, 40% of the UEs. The present technology maintains the UE in an idle state during the N4 interface glitch. By avoiding establishment of an N3 data path for 60% of the UEs, the network load can be significantly reduced.

The UE 102 may initiate a service request if the UE 102 has data to send. For example, the service request may be received from the UE 102, and N3 is an interface between the UPF 106 and the base station 206. The operation can be performs as described above with reference to step 421 in FIGS. 4A-4C.

At operation 508, method 500 includes attempting, using the SMF 112, to establish the N4 session while the timer is active. In one example, during the attempting, an N3 data path between the UPF 106 and the base station 206 is not established.

In one example, attempting to establish the N4 session between the SMF 112 and the UPF 106 may further include sending, using the SMF 112, an N10 registration request to a Unified Data Management (UDM) 202 at the core network component, where N10 is the interface between the SMF 112 and the UDM 202.

In another example, attempting to establish the N4 session between the SMF 112 and the UPF 106 may further include receiving, using the SMF 112, a notification of N10 registration success from UDM 202.

In another example, attempting to establish the N4 session between the SMF and the UPF may further include sending, using the SMF, a N1N2 transfer request to the AMF. For example, the SMF 112 may send an N10 registration request to a Unified Data Management (UDM) 202 at the core network component, where N10 is the interface between the SMF and the UDM. This operation can be performs as described above with reference to step 417 in FIGS. 4A-4C. In one example, the SMF 112 may also receive a notification of N10 registration success from UDM, which can be performs as described above with reference to step 418 in FIGS. 4A-4C. The SMF 112 may also send an N1N2 transfer request to the AMF, which can be performs as described above with reference to step 419 in FIGS. 4A-4C. Then, the AMF 110 may send an N1 transfer request to the UE 102, and sends an N2 transfer request to the base station 206.

The N4 session establishment while the timer is alive may also be referred to as a session creation with N4 fail open in case of the N4 interface failure during a PDU session establishment. In another example, when the session creation with N4 fail open is completed, an N2 session between the base station 206 and AMF 110 is not established.

At operation 510, method 500 includes bringing, using the SMF, the user equipment back to an active state after the N4 session is established. When the UE 102 is in an active state, data can be transferred from the UE 102 to UPF 106. This operation can be performs as described above with reference to step 421 in FIGS. 4A-4C.

In some aspects, method 500 may also include reattempting, using the SMF, to establish the N4 session after the timer is expired, and bringing the UE 102 back to an active state when the N4 session is established after the reattempting. For example, the SMF 112 may reattempt to establish the N4 session after the timer is expired, and brings the UE 102 back to an active state when the N4 session is established after the reattempting. Now, an N3 data path is established. This operation can be performs as described above with reference to steps 422-434 in FIGS. 4A-4C.

In one example, reattempting to establish the N4 session may include sending, using the SMF 112, an N4 session establishment request to the UPF 106, which can be performs as described above with reference to step 422.

In another example, reattempting to establish the N4 session may also include receiving, using the SMF 112, an N4 session establishment response from the UPF 106, which can be performs as described above with reference to step 424.

In another example, reattempting to establish the N4 session may also include sending, using the SMF, N1N2 transfer request to an Access and Mobility Management Function (AMF), which can be performs as described above with reference to step 426.

For example, the SMF 112 can send an N4 session establishment request to the UPF 106, which can be performs as described above with reference to step 422 in FIGS. 4A-4C. In one example, the SMF 112 may also receive an N4 session establishment response from the UPF 106, which can be performs as described above with reference to step 424 in FIGS. 4A-4C. In another example, the SMF 112 may also send an N1N2 transfer request to an Access and Mobility Management Function (AMF) 110, which can be performs as described above with reference to step 426 in FIGS. 4A-4C. The N1N2 transfer request may include an N1 transfer request and/or an N2 transfer request. Then, the AMF 110 may send the N1 transfer request to the UE 102, and may send the N2 transfer request to the base station.

When the reattempting to establish the N4 session is successful, the N4 session includes an N3 data path for the UE 102 to send data to UPF 106.

Figure 6:
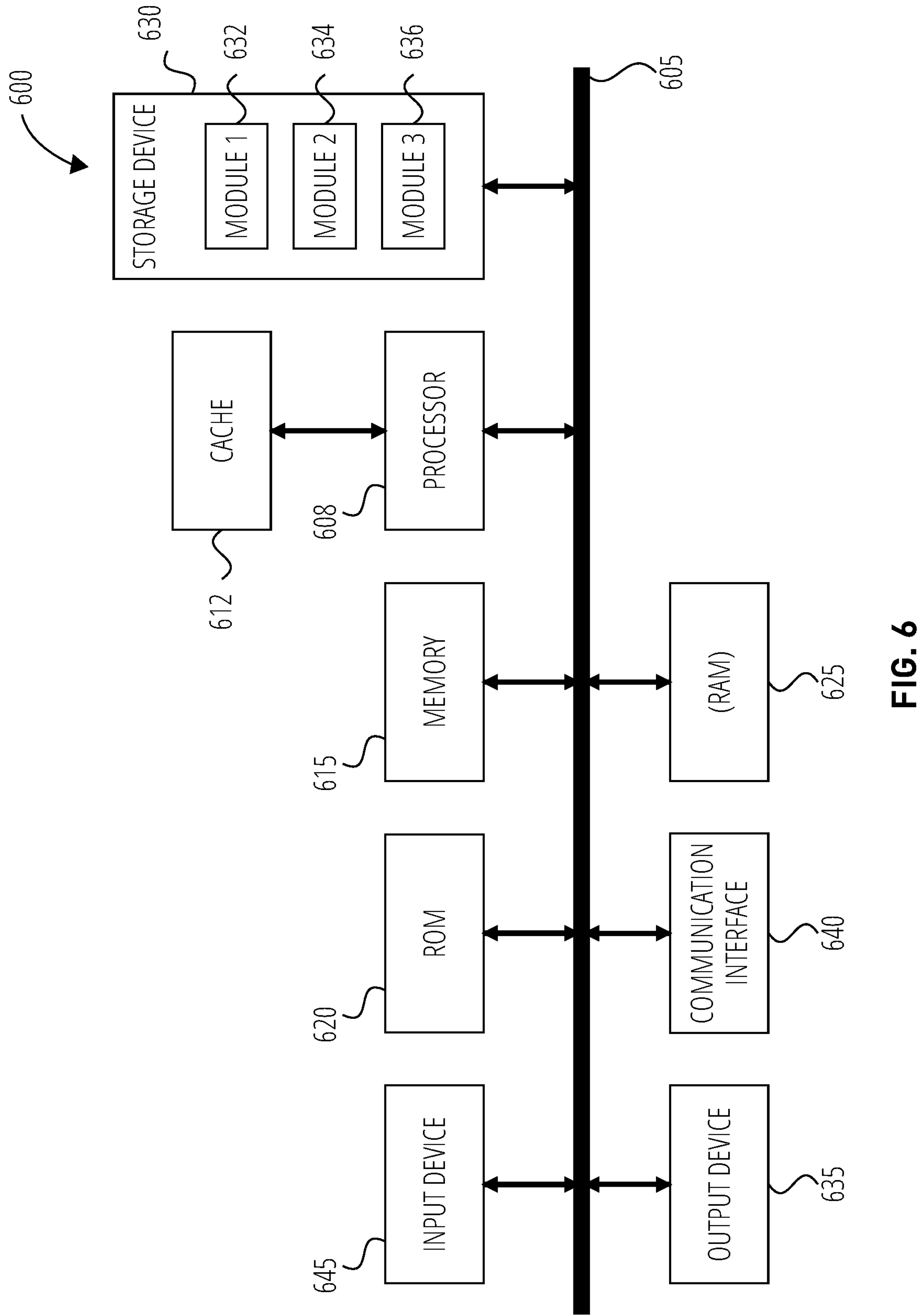
FIG. 6 shows an example of a computing system for implementing certain aspects of the present technology.

FIG. 6 shows an example of computing system 600, which can be, for example any computing device making up the content server 118, and other devices described herein, or any component thereof in which the components of the system are in communication with each other using connection 605. Connection 605 can be a physical connection via a bus, or a direct connection to processor 608, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 808 and connection 605 that couples various system components including memory 615, such as read-only memory (ROM) 620 and random-access memory (RAM) 625 to processor 608. Computing system 600 can include a cache of high-speed memory 612 connected directly with, in close proximity to, or integrated as part of processor 608.

Processor 608 can include any general-purpose processor and a hardware service or software service, such as services 632, 634, and 636 stored in storage device 630, configured to control processor 608 as well as a special-purpose processor where software instructions are incorporated into the actual processor design. Processor 608 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 608, it causes the system to perform a function. In some embodiments, a hardware service that performs a particular function can include the software component stored in a computer-readable medium in connection with the necessary hardware components, such as processor 608, connection 605, output device 635, etc., to carry out the function.

Figure 7:
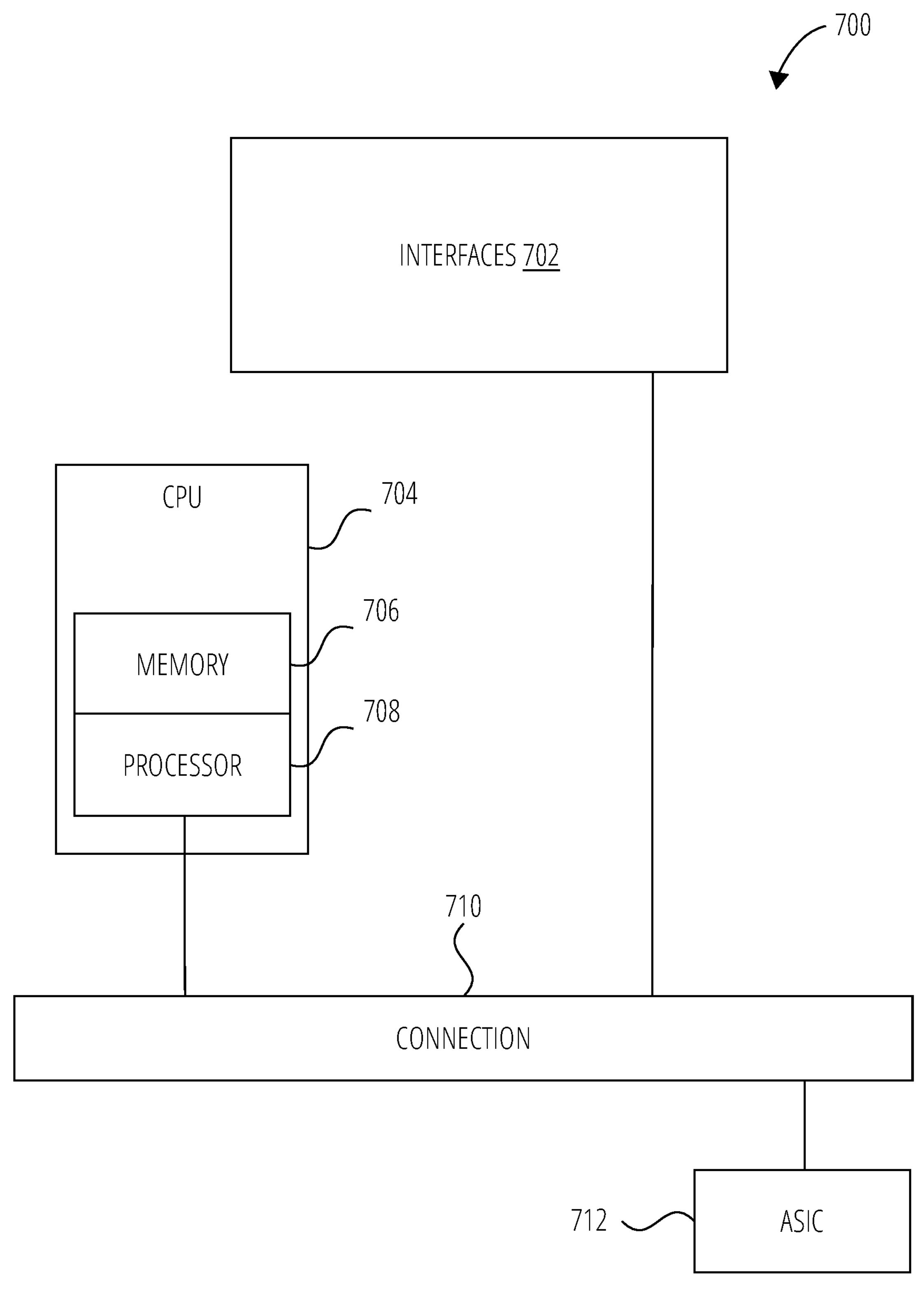
FIG. 7 illustrates an example network device for implementing certain aspects of the present technology.

FIG. 7 illustrates an example network device 700 suitable for performing switching, routing, load balancing, and other networking operations. The example network device 700 can be implemented as switches, routers, nodes, metadata servers, load balancers, client devices, and so forth.

Network device 700 includes a central processing unit (CPU) 704, interfaces 702, and a connection 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 704) to efficiently perform routing computations, network diagnostics, security functions, etc.

Although the system shown in FIG. 7 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC) 712, which can be configured to perform routing and/or switching operations. The ASIC 712 can communicate with other components in the network device 700 via the connection 710, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method, comprising:

detecting, using a session management function (SMF) at a core network component, an N4 session failure between the SMF and a User Plane Function (UPF) at the core network component;

initiating, using the SMF, a timer for establishing an N4 session between the SMF and the UPF;

maintaining, using the SMF, a user equipment connected to a network in an idle state while the timer is active;

attempting, using the SMF, to establish the N4 session while the timer is active; and bringing, using the SMF, the user equipment back to an active state after the N4 session is established.

2. The method of claim 1, further comprising:

detecting, using the SMF, a service request to establish an N3 path between a base station and the UPF in the network, wherein the base station is connected to the user equipment; and establishing an N3 session for the user equipment to send data over the N3 path while the timer is active.

3. The method of claim 2, wherein the service request is received from the user equipment, and N3 is an interface between the UPF and the base station.

4. The method of claim 2, further comprising:

reattempting, using the SMF, to establish the N4 session after the timer is expired; and bringing the user equipment back to an active state when the N4 session is established after the reattempting.

5. The method of claim 4, wherein the reattempting to establish the N4 session comprises:

sending, using the SMF, an N4 session establishment request to the UPF;

receiving, using the SMF, an N4 session establishment response from the UPF; and sending, using the SMF, N1N2 transfer request to an Access and Mobility Management Function (AMF).

6. The method of claim 1, wherein the attempting to establish the N4 session between the SMF and the UPF further comprises:

sending, using the SMF, an N10 registration request to a Unified Data Management (UDM) at the core network component, wherein N10 is an interface between the SMF and the UDM;

receiving, using the SMF, a notification of N10 registration success from UDM; and sending, using the SMF, a N1N2 transfer request to an Access and Mobility Management Function (AMF).

7. The method of claim 6, wherein an N3 data path between the UPF and a base station is not established during attempting to establish the N4 session.

8. A device comprising:

a processor; and a memory configured to store instructions that, when executed by the processor, configure the device to:

detect, using a session management function (SMF), an N4 session failure between the SMF and a User Plane Function (UPF);

initiate, using the SMF, a timer for establishing an N4 session between the SMF and the UPF;

maintain, using the SMF, a user equipment connected to a network in an idle state while the timer is active;

attempt, using the SMF, to establish the N4 session while the timer is active; and bring, using the SMF, the user equipment back to an active state after the N4 session is established.

9. The device of claim 8, wherein the processor is further configured to execute the instructions to configure the device to:

detect, using the SMF, a service request to establish an N3 path between a base station and the UPF in the network, wherein the base station is connected to the user equipment; and establish an N3 session for the user equipment to send data over the N3 path while the timer is active.

10. The device of claim 9, wherein the service request is received from the user equipment, and N3 is an interface between the UPF and the base station.

11. The device of claim 9, wherein the processor is further configured to execute the instructions to configure the device to:

reattempt, using the SMF, to establish the N4 session after the timer is expired; and bring the user equipment back to an active state when the N4 session is established after the reattempting.

12. The device of claim 11, wherein the processor is further configured to execute the instructions to reattempt establishing the N4 session by:

sending, using the SMF, an N4 session establishment request to the UPF;

receiving, using the SMF, an N4 session establishment response from the UPF; and sending, using the SMF, N1N2 transfer request to an Access and Mobility Management Function (AMF).

13. The device of claim 8, wherein the processor is further configured to execute the instructions to attempt establishing the N4 session between the SMF and the UPF by:

sending, using the SMF, an N10 registration request to a Unified Data Management (UDM), wherein N10 is an interface between the SMF and the UDM;

receiving, using the SMF, a notification of N10 registration success from UDM; and sending, using the SMF, a N1N2 transfer request to an Access and Mobility Management Function (AMF).

14. The device of claim 8, wherein an N3 data path between the UPF and a base station is not established during attempting to establish the N4 session.

15. One or more non-transitory computer-readable storage media comprising computer-readable instructions, which when executed by one or more processors of a core network of a wireless communication system, cause the core network to:

detect, using a session management function (SMF), an N4 session failure between the SMF and a User Plane Function (UPF);

initiate, using the SMF, a timer for establishing an N4 session between the SMF and the UPF;

maintain, using the SMF, a user equipment connected to a network in an idle state while the timer is active;

attempt, using the SMF, to establish the N4 session while the timer is active; and bring, using the SMF, the user equipment back to an active state after the N4 session is established.

16. The one or more non-transitory computer-readable storage media of claim 15, wherein the execution of the computer-readable instructions by the one or more processors further configures the core network to:

detect, using the SMF, a service request to establish an N3 path between a base station and the UPF in the network, wherein the base station is connected to the user equipment; and establish an N3 session for the user equipment to send data over the N3 path while the timer is active.

17. The one or more non-transitory computer-readable storage media of claim 16, wherein the service request is received from the user equipment, and N3 is an interface between the UPF and the base station.

18. The one or more non-transitory computer-readable storage media of claim 16, wherein the execution of the computer-readable instructions by the one or more processors further configures the core network to:

reattempt, using the SMF, to establish the N4 session after the timer is expired; and bring the user equipment back to an active state when the N4 session is established after the reattempting.

19. The one or more non-transitory computer-readable storage media of claim 18, wherein the execution of the computer-readable instructions by the one or more processors further configures the core network to reattempt establishing the N4 session by:

sending, using the SMF, an N4 session establishment request to the UPF;

receiving, using the SMF, an N4 session establishment response from the UPF; and sending, using the SMF, N1N2 transfer request to an Access and Mobility Management Function (AMF).

20. The one or more non-transitory computer-readable storage media of claim 15, wherein the execution of the computer-readable instructions by the one or more processors further configures the core network to attempt establishing the N4 session between the SMF and the UPF by:

sending, using the SMF, an N10 registration request to a Unified Data Management (UDM), wherein N10 is an interface between the SMF and the UDM;

receiving, using the SMF, a notification of N10 registration success from UDM; and sending, using the SMF, a N1N2 transfer request to an Access and Mobility Management Function (AMF).

* * * * *